United States Patent
Kim

(10) Patent No.: US 10,086,872 B2
(45) Date of Patent: Oct. 2, 2018

(54) LANE KEEPING CONTROL METHOD AND APPARATUS THEREOF

(71) Applicant: MANDO CORPORATION, Gyeonggi-do (KR)

(72) Inventor: Soon Tae Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 74 days.

(21) Appl. No.: 15/215,542

(22) Filed: Jul. 20, 2016

(65) Prior Publication Data

US 2017/0029025 A1 Feb. 2, 2017

(30) Foreign Application Priority Data

Jul. 29, 2015 (KR) .................. 10-2015-0107042

(51) Int. Cl.
| | | |
|---|---|---|
| *A01B 69/00* | (2006.01) | |
| *B62D 6/00* | (2006.01) | |
| *B62D 11/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *B62D 15/02* | (2006.01) | |
| *B62D 6/10* | (2006.01) | |

(Continued)

(52) U.S. Cl.
CPC .......... *B62D 15/025* (2013.01); *B60W 30/00* (2013.01); *B62D 6/10* (2013.01); *G05D 1/0246* (2013.01)

(58) Field of Classification Search
None
See application file for complete search history.

(56) References Cited

U.S. PATENT DOCUMENTS

2016/0176400 A1* 6/2016 Nakano ................ B62D 15/025
701/41

FOREIGN PATENT DOCUMENTS

| CN | 101318472 | 12/2008 |
| CN | 103140408 | 6/2013 |
| DE | 10 2007 011 276 | 9/2008 |

(Continued)

OTHER PUBLICATIONS

Machine Translation JP-4967484-B2 published Jul. 2012.*

(Continued)

*Primary Examiner* — Anne M Antonucci
*Assistant Examiner* — Kenny A. Taveras
(74) *Attorney, Agent, or Firm* — Ladas & Parry, LLP

(57) ABSTRACT

The present invention relates to a lane keeping control method of the vehicle and an apparatus thereof. More specifically, the present invention relates to a method and an apparatus for calculating a torque for the lane keeping of the vehicle. In particular, the present invention provides a lane keeping control device that includes: a receiving unit that is configured to receive sensed information containing lane information from one or more sensors in the vehicle; a target torque calculating unit that is configured to calculate a target torque for the lane keeping of the vehicle based on the sensed information; and a final torque calculating unit that is configured to calculate a final torque for the lane keeping based on a driver steering torque and the target torque according to the input of the driver steering torque, and further provides a lane keeping control method.

9 Claims, 9 Drawing Sheets

(51) Int. Cl.
    *G05D 1/02*       (2006.01)
    *B60W 30/00*      (2006.01)

(56) References Cited

FOREIGN PATENT DOCUMENTS

| | | |
|---|---|---|
| DE | 10 2008 057 313 | 10/2009 |
| DE | 10 2014 226 781 | 6/2016 |
| JP | 4967484 B2 * | 7/2012 |
| JP | 2015-20719 | 2/2015 |

OTHER PUBLICATIONS

Office Action dated Apr. 4, 2018 for Chinese Patent Application No. 201610619460.1 and its English machine translation by Google Translate.

Office Action dated Jan. 30, 2018 for German Patent Application No. 10 2016 113 699.9 and its English machine translation by Google Translate.

\* cited by examiner

LANE KEEPING CONTROL METHOD AND APPARATUS THEREOF

CROSS REFERENCE TO RELATED APPLICATION

This application claims priority from Korean Patent Application No. 10-2015-0107042, filed on Jul. 29, 2015, which is hereby incorporated by reference for all purposes as if fully set forth herein.

BACKGROUND OF THE INVENTION

1. Field of the Invention

The present invention relates to a lane keeping control method for vehicles, and further relates to an apparatus thereof. More specifically, the present invention relates to a method and an apparatus for calculating a torque for the lane keeping of the vehicle.

2. Description of the Prior Art

The lane keeping assist system (LKAS) receives lane information and vehicle position information from a lane detecting camera that is mounted on the vehicle, and generates a steering torque for preventing the lane departure of the vehicle in order to thereby assist the travelling of the vehicle.

More specifically, the lane keeping assist system may control a steering device of the vehicle such that the vehicle travels along the travelling path in the lane by using lane information that is detected by a front camera. Alternatively, the lane keeping assist system may detect the lane departure of the vehicle by using the lane information, and may make a control to prevent the lane departure of the vehicle by controlling the steering device.

However, the driver may control the vehicle through the manipulation of a steering wheel even when the lane keeping assist system of the vehicle is in progress. In this case, a steering torque calculated by the lane keeping control device and a steering torque generated by the driver may overlap each other.

In addition, when the steering torque of the driver and the steering torque generated by the lane keeping assist system overlap each other, the driver may feel the steering heterogeneity due to the occurrence of a steering torque that is different from the steering torque intended by the driver.

Such steering heterogeneity may result in a movement of the vehicle that is different from the driver's intention for steering the vehicle, so the possibility of inducing accidents may increase.

SUMMARY OF THE INVENTION

In this background, the present embodiments provide a lane keeping control method and an apparatus for reducing the driver's heterogeneity when a steering torque of the driver is input while the lane keeping assist system is in progress.

Alternatively, the present embodiments provide a detailed method and an apparatus for stably maintaining the movement of the vehicle and for reducing the possibility of accidents when the steering torque calculated by the lane keeping assist system and the steering torque of the driver overlap each other.

According to an aspect of the present invention, a lane keeping control device may include: a receiving unit that is configured to receive sensed information containing lane information from one or more sensors in the vehicle; a target torque calculating unit that is configured to calculate a target torque for the lane keeping of the vehicle based on the sensed information; and a final torque calculating unit that is configured to calculate a final torque for the lane keeping based on a driver steering torque and the target torque according to the input of the driver steering torque.

According to another aspect of the present invention, a lane keeping control method may include: receiving sensed information containing lane information from one or more sensors in the vehicle; calculating a target torque for the lane keeping of the vehicle based on the sensed information; and calculating a final torque for the lane keeping based on a driver steering torque and the target torque according to the input of the driver steering torque.

As described above, the present embodiments have an effect that provides a lane keeping control method and an apparatus for reducing the driver's heterogeneity when a steering torque of the driver is input while the lane keeping assist system is in progress.

In addition, the present embodiments may have an effect that provides a detailed method and an apparatus for stably maintaining the movement of the vehicle and for reducing the possibility of accidents when the steering torque calculated by the lane keeping assist system and the steering torque of the driver overlap each other.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, aspects of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Meanwhile, in the present specification, a target torque, a final torque, a driver steering torque, and a reference torque refer to vector quantities, which include direction and magnitude components. Thus, the torque addition and subtraction in the present specification will be made to include a calculation of the direction component, and each torque may be expressed as a positive (+) value or a negative (−) value based on a predetermined reference direction. However, the direction component of the torque and an absolute value thereof may be separately explained for the convenience of understanding.

Hereinafter, a lane keeping control device and a control method thereof, according to an embodiment, will be described with reference to the drawings.

Figure 1:
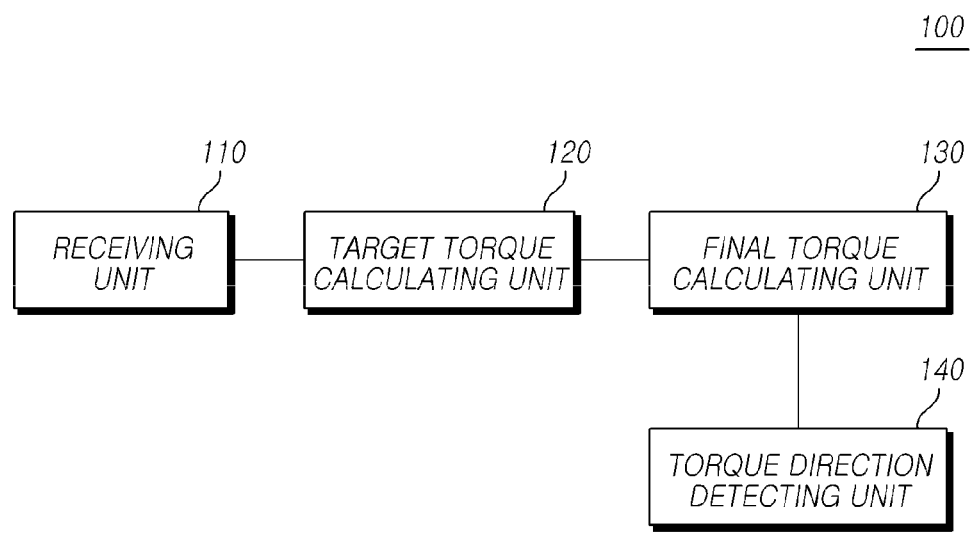
FIG. 1 is a view to explain the configuration of a lane keeping control device, according to an embodiment.

FIG. 1 is a view to explain the configuration of a lane keeping control device, according to an embodiment.

A lane keeping control device, according to an embodiment, may include: a receiving unit configured to receive sensed information containing lane information from one or more sensors in the vehicle; a target torque calculating unit configured to calculate a target torque for the lane keeping of the vehicle based on the sensed information; and a final torque calculating unit configured to calculate a final torque for the lane keeping based on a driver steering torque and the target torque according to the input of the driver steering torque.

Referring to FIG. 1, the lane keeping control device 100, according to an embodiment, includes a receiving unit 110 that receives sensed information containing lane information from one or more sensors in the vehicle. The receiving unit 110 receives the sensed information from at least one of a radar sensor, a laser radar sensor, a torque sensor, a vehicle speed sensor, a steering angle sensor, or a camera sensor, which is configured in the vehicle. For example, the sensed information may contain road image information and lane image information, which are sensed by the camera sensor. In addition, the sensed information may contain steering torque information or steering angle information of the driver, which are sensed by the torque sensor or the steering angle sensor. Alternatively, the sensed information may further contain information that is necessary for determining the lane keeping or lane departure of the vehicle through the lane keeping assist system and information that is necessary for calculating a target torque for the lane keeping. For example, the receiving unit 110 may receive lane information, travelling direction information of the vehicle, or steering angle information of the vehicle, which are necessary for the lane keeping control device to keep the vehicle in the lane.

Meanwhile, the sensed information may mean information itself, which is obtained from the sensors, or may mean information that is obtained by processing the information received from the sensors. For example, the lane information may mean image information itself, which includes the lanes of the road sensed by the camera sensor, or may mean lane information that has been processed by the camera sensor or by a control unit for controlling the camera sensor. That is, the sensed information may contain lane information that is extracted from the road image as well as the image information itself. Meanwhile, when the road image information is received, the lane keeping control device may extract the lane information from the corresponding road image information through the image processing operation. Although the road image information was described above as an example, this may be applied to all of the sensed information received from the sensors described above in the same manner.

The lane keeping control device 100 may include a target torque calculating unit 120 that calculates a target torque for the lane keeping of the vehicle based on the sensed information. For example, the target torque calculating unit 120 may calculate a target torque that is necessary for the vehicle to keep the lane by determining the lane keeping or lane departure of the vehicle by using the sensed information. Alternatively, if it is determined that the vehicle is leaving a predetermined travelling path in its lane, the target torque calculating unit 120 may calculate a target torque that is necessary for the vehicle to follow the corresponding travelling path. For example, if it is determined that the vehicle begins to move out of its lane by using the vehicle speed information received from the vehicle speed sensor, the lane information, and the vehicle travelling direction information, the target torque calculating unit 120 calculates a target torque necessary for the corresponding vehicle to travel along the predetermined path in the lane. If the vehicle travels close to the right lane of the vehicle and if the distance between the vehicle and the road surface-marked line decreases below a predetermined distance, the target torque calculating unit 120 may calculate a target torque of the left direction such that the distance between the vehicle and the road surface-marked line is changed within a predetermined distance range in consideration of the current vehicle speed information. At this time, the target torque calculating unit 120 may calculate a target torque of the vehicle in consideration of the vehicle speed information in order to thereby prevent an abrupt direction change. Likewise, in the case where the vehicle travels close to the left lane of the vehicle, the target torque calculating unit 120 may calculate a target torque through the same procedure. The calculated target torque may be applied to control the steering angle of the vehicle through the steering control device.

The lane keeping control device 100 includes a final torque calculating unit 130 that calculates a final torque for the lane keeping based on the driver steering torque and the target torque according to the input of the driver steering torque. For example, the final torque calculating unit 130 may calculate a final torque that is used to change the travelling direction of the vehicle through the steering control device of the vehicle. That is, when the vehicle is leaving its lane, the final torque calculating unit 130 calculates a steering torque in order for the vehicle to travel along a predetermined travelling path in its lane. In this case, the final torque calculating unit 130 may differently calculate the final torque depending on the detection or non-detection of the driver steering torque.

For example, if the driver steering torque is input at the time of calculating the final torque for the lane keeping assistance, the final torque calculating unit 130 may calculate the final torque in consideration of the driver steering torque. For example, the final torque calculating unit 130 may calculate the final torque to minimize the driver's steering heterogeneity and to stably maintain the movement of the vehicle in consideration of the driver steering torque in addition to the final torque that is calculated by the target torque calculating unit 120.

As another example, if the driver steering torque is not input at the time of calculating the final torque for the lane keeping assistance, the final torque calculating unit 130 may calculate, as the final torque, the target torque that is calculated by the target torque calculating unit 120.

As another example, the final torque calculating unit 130 may calculate the final torque in consideration of the driver steering torque only when the driver steering torque is equal to, or more than, a predetermined reference torque.

Meanwhile, the final torque calculating unit 130 may further include a torque direction detecting unit 140 that detects whether or not the driver steering torque direction matches the target torque direction. The torque direction detecting unit 140 may determine whether or not the direction of the driver steering torque received from the sensor matches the direction of the calculated target torque. As described above, the torque has a vector quantity, which may include information about the direction. For example, when the driver operates a steering wheel in the clockwise direction, the driver steering torque may be expressed as a negative (−) value. On the contrary, when the driver steering torque is detected in the counter-clockwise direction, the corresponding driver steering torque may be expressed as a positive (+) value. The positive (+) vehicle or the negative (−) vehicle according to the direction may be changed by the configuration of the vehicle. Likewise, the target torque and the final torque may have a positive (+) value or a negative (−) value. The torque direction detecting unit 140 may detect the direction of the driver steering torque and the direction of the target torque, respectively, by using the torque information, and may determine whether or not the direction of the driver steering torque and the direction of the target torque match each other based on the same.

The final torque calculating unit 130 may calculate the final torque to conform to each situation by using the direction information of each torque. The detailed operation in which the final torque calculating unit 130 calculates the final torque depending on the torque direction will be described with reference to the drawings below.

The lane keeping control device 100, according to an embodiment, may control the movement of the vehicle or may display necessary information by using the calculated final torque. For example, when the final torque is calculated, the lane keeping control device 100 may apply a control current for generating the corresponding final torque to an auxiliary steering motor of the vehicle in order to thereby control the movement of the vehicle. Alternatively, the lane keeping control device 100 may transfer the information on the final torque to the steering control device so that the steering control device can control the movement of the vehicle.

Hereinafter, the detailed operation of the lane keeping control device will be described in more detail with reference to the drawings.

Figure 2A:
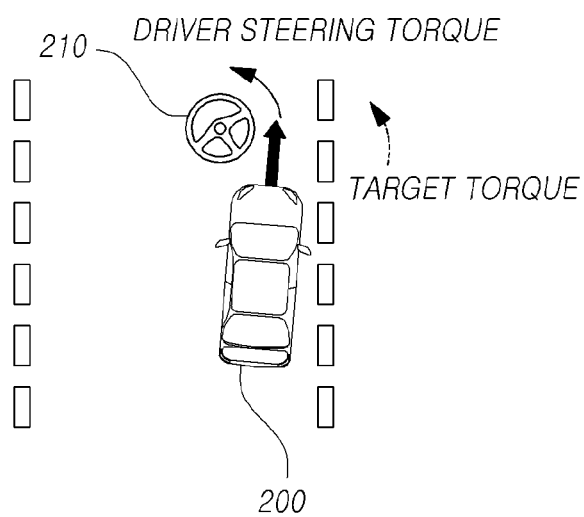
FIGS. 2A and 2B are views showing examples in which a driver steering torque and a target torque overlap each other, according to an embodiment.
Figure 2B:
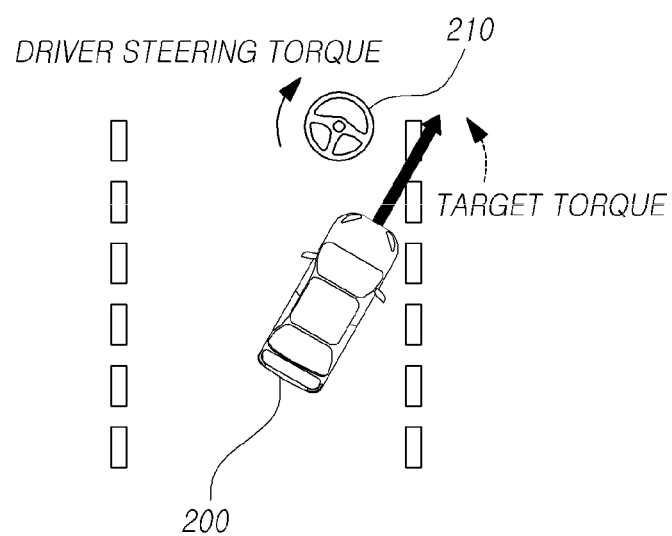

FIGS. 2A and 2B are views showing examples in which the driver steering torque and the target torque overlap each other, according to an embodiment.

FIG. 2A shows the case in which the driver steering torque and the target torque match each other. Referring to FIG. 2A, when the vehicle 200 begins to leave the path configured by the lane keeping assist system and approaches the road surface-marked line, the lane keeping control device calculates a target torque to prevent the lane departure. In this case, the target torque may be calculated in the counter-clockwise direction. Meanwhile, in the case where the vehicle approaches the road surface-marked line, the driver may manipulate the steering wheel 210 in order to thereby generate a steering torque. If the driver operates the steering wheel 210 in the counter-clockwise direction, the driver steering torque is also detected in the same direction as the target torque.

However, in the existing lane keeping control device, when the driver steering torque is the same as the target torque, a larger torque than the torque targeted by the driver or the lane keeping control device is transferred to the steering device because the torques overlap each other so that the movement of the vehicle may be unstable.

Therefore, the present embodiment provides a final torque calculating method for reducing the instability of the vehicle movement in the case above.

FIG. 2B shows the case in which the direction of the driver steering torque is opposite to the direction of the target torque. Referring to FIG. 2B, the driver may intend to change the lane, and may manipulate the steering wheel 210 in the clockwise direction. In this case, the driver steering torque is detected as a value of the counter-clockwise direction. If the lane keeping assist system is in progress in this situation, the lane keeping control device calculates a target torque in the opposite direction of the driver steering torque in order to prevent the lane departure of the vehicle 200. That is, the lane keeping control device calculates a target torque of the direction to prevent the lane change.

Accordingly, the driver steering torque and the target torque conflict with each other so that the driver senses a repulsive force according to the generation of the target torque. This will provide the driver with a steering heterogeneity. The present embodiment provides a final torque calculating method for minimizing the driver's steering heterogeneity in the case above.

Hereinafter, the operation of the lane keeping control device will be described with respect to the case in which the direction of the driver steering torque and the direction of the target torque match each other and with respect to the case in which the direction of the driver steering torque is opposite to the direction of the target torque.

Figure 3A:
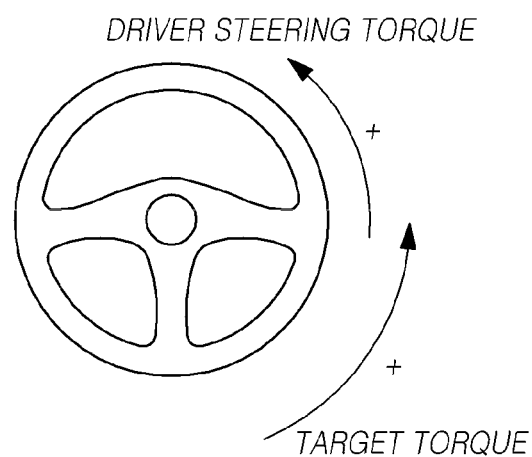
FIGS. 3A and 3B are views to explain an operation of calculating a final torque when the direction of a driver steering torque is the same as the direction of a target torque, according to an embodiment.
Figure 3B:
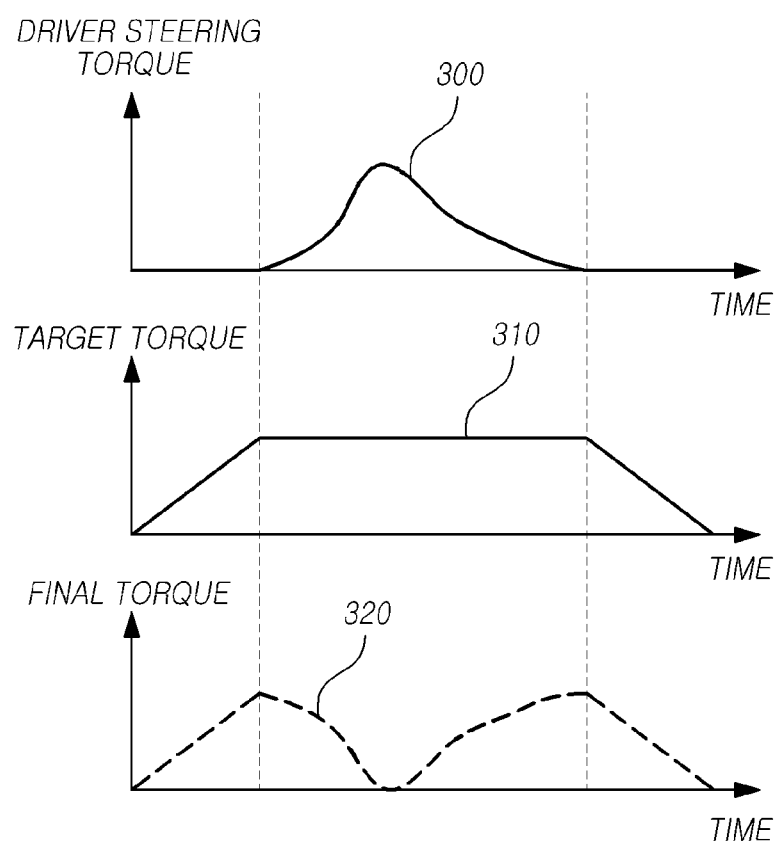

FIGS. 3A and 3B are views to explain an operation of calculating a final torque when the direction of the driver steering torque is the same as the direction of the target torque, according to an embodiment.

If the driver steering torque and the target torque are detected in the same direction, the final torque calculating unit, according to an embodiment, may subtract the driver steering torque from the target torque in order to thereby calculate a final torque. That is, the final torque may be determined by the vector difference between the target torque and the driver steering torque.

Referring to FIGS. 3A and 3B, if the target torque and the driver steering torque overlap each other in the same direction, the lane keeping control device may reduce the target torque in proportion to the driver steering torque in order to thereby prevent the generation of an excessive steering torque. Alternatively, with regard to the subtraction of the driver steering torque from the target torque, the lane keeping control device may apply predetermined weight value information to the driver steering torque, and may then subtract the driver steering torque applied with a weight value from the target torque in order to thereby calculate the final torque.

More specifically, in the case where the driver steering torque has a positive (+) value and the target torque is calculated to have a positive (+) value as shown in FIG. 3A, the final torque calculating unit may subtract the driver steering torque from the target torque in order to thereby calculate the final torque.

For example, the final torque may be calculated as Equation 1 below.

$$T_{LKAS} = T_{DES} - K_S * T_D \qquad \text{[Equation 1]}$$

In Equation 1, $T_{LKAS}$ denotes a final torque that is applied to the steering control device in the lane keeping assist system, and $T_D$ denotes a driver steering torque that is received from the torque sensor. In addition, $T_{DES}$ refers to a target torque, and $K_S$ refers to a predetermined proportional constant.

Thus, the final torque calculating unit subtracts, from the target torque, a value that is obtained by multiplying the driver steering torque by a predetermined proportional constant in order to thereby calculate the final torque. Here, the proportional constant may be pre-configured with a weight value that is applied to the driver steering torque, or may be dynamically changed.

Referring to FIG. 3B, in the case where the driver steering torque and the target torque have values of the same direction as shown in FIG. 3A, the final torque 320 is calculated to be a value that is obtained by subtracting the driver steering torque 300 from the target torque 310. Therefore, as the driver steering torque 300 increases, the final torque 320 decreases in proportion to the driver steering torque 300.

This may solve the problem in which the vehicle is provided with an excessive steering torque due to the overlapping of the driver steering torque and the target torque.

Figure 4A:
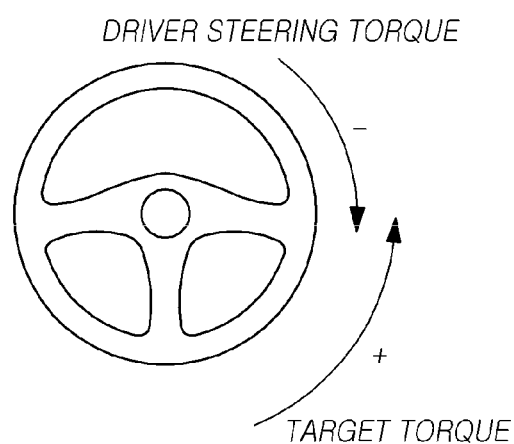
FIGS. 4A and 4B are views to explain an operation of calculating a final torque when the direction of a driver steering torque is opposite to the direction of a target torque, according to an embodiment.
Figure 4B:
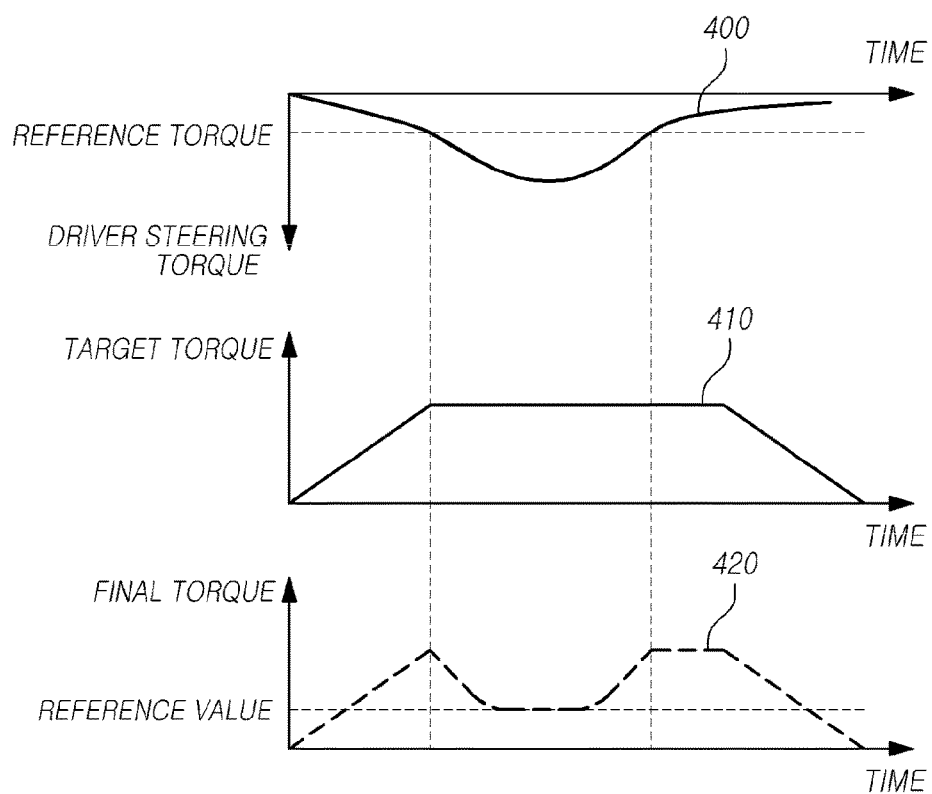

FIGS. 4A and 4B are views to explain an operation of calculating a final torque when the direction of the driver steering torque is opposite to the direction of the target torque, according to an embodiment.

If the driver steering torque and the target torque are detected in the opposite directions, the final torque calculating unit, according to an embodiment, may calculate a final torque by vector-summating the target torque and the driver steering torque. Since the direction of the target torque is opposite to the direction of the driver steering torque, the final torque will be reduced compared to the target torque by a vector sum of the target torque and the driver steering torque. Hereinafter, the vector-summation and the addition will be used as the same meaning on the assumption that the target torque and the driver steering torque are vector quantities. In addition, with regard to the calculation of the final torque, the driver steering torque may be applied with a predetermined weight value to then be added to the target torque.

Referring to FIG. 4A, the driver steering torque may be detected as a negative (−) value, and the target torque may be calculated as a positive (+) value. That is, the driver steering torque and the target torque have values of the opposite directions. In this case, the final torque calculating unit calculates the final torque by adding the driver steering torque to the target torque. For example, since the driver steering torque has a negative (−) value and the target torque has a positive (+) value, the final torque may be calculated to have a reduced torque from the target torque.

Likewise, in the case where the driver steering torque has a positive (+) value and the target torque has a negative (−) value, the final torque is also calculated by adding the driver steering torque to the target torque. Thus, the final torque has a reduced value compared to the target torque.

As another example, when the driver steering torque is less than a predetermined reference torque, the final torque calculating unit may calculate the target torque as the final torque. That is, the final torque calculating unit may calculate the final torque by adding the driver steering torque to the target torque only when the received driver steering torque is equal to, or more than, a reference torque, and may calculate the target torque as the final torque when the driver steering torque is less than a reference torque. This may prevent an unnecessary operation of reducing the target torque according to the driver's fine manipulation of the steering wheel in order to thereby improve the stability of the vehicle movement. The reference torque may be pre-configured based on the repulsive force that may occur according to the driver steering torque. Alternatively, the reference torque may be dynamically changed based on the distance between the vehicle and the road surface-marked line to then be configured. For example, the reference torque may be configured to increase or decrease depending on the degree of proximity of the vehicle with respect to the road surface-marked line.

As another example, when the driver steering torque is equal to, or more than, a reference torque, the final torque calculating unit may add a torque, which is obtained by subtracting the reference torque from the driver steering torque, to the target torque in order to thereby calculate the final torque. That is, when the driver steering torque is equal to, or more than, a reference torque, the final torque calculating unit may adjust the target torque to then calculate the final torque. In addition, in this case, the final torque calculating unit may add a torque, which is obtained by subtracting the reference torque from the driver steering torque, to the target torque in order to thereby calculate the final torque. The reference torque may be configured to have the same direction as the driver steering torque, and the magnitude value of the reference torque may be pre-configured through experiments. Alternatively, the magnitude value of the reference torque may be changed in association with the driver steering torque. Thus, the final torque may be calculated as Equation 2 below.

$$T_{LKAS}=T_{DES}+K_R*(T_D-T_R) \quad \text{[Equation 2]}$$

In Equation 2, $T_{LKAS}$ denotes a final torque that is applied to the steering control device in the lane keeping assist system, and $T_D$ denotes a driver steering torque that is received from the torque sensor. $T_{DES}$ refers to a target torque. In addition, $T_R$ refers to a reference torque, and $K_R$ refers to a predetermined proportional constant.

According to this, the lane keeping control device can minimize the driver's steering heterogeneity even when the driver steering torque is applied in the opposite direction of the target torque.

As shown in FIG. 4B, even when the driver steering torque 400 is applied, if the driver steering torque 400 does not exceed a reference torque, the final torque 420 may be calculated to be the same as the target torque 410. If a driver steering torque 400 of more than a reference torque is applied, the final torque 420 may be calculated by adding the difference between the driver steering torque 400 and the reference torque to the target torque 410. Since the driver steering torque 400 and the target torque 410 have opposite directions, even though the difference between the driver steering torque and the reference torque is added to the target torque, the final torque 420 may be calculated to have a reduced value from the target torque 410.

In addition, when the final torque reaches a predetermined reference value, the final torque calculating unit may maintain the final torque to be the reference value. For example, the final torque 420 may be maintained without decreasing below the reference value in consideration of the driver steering torque 400. The reference value may be pre-configured in order to maintain the lane keeping function even if it is reduced more than a specific value from the target torque 410. For example, the reference value may be obtained by multiplying the target torque 410 by a predetermined ratio. That is, the reference value may be configured to be 30% of the target torque. In this case, the reference value may vary according to the calculated target torque. Alternatively, the reference value may be configured to be a predetermined value. According to this, it is possible to reduce the driver's steering heterogeneity and to recognize the risk of the lane departure.

Figure 5:
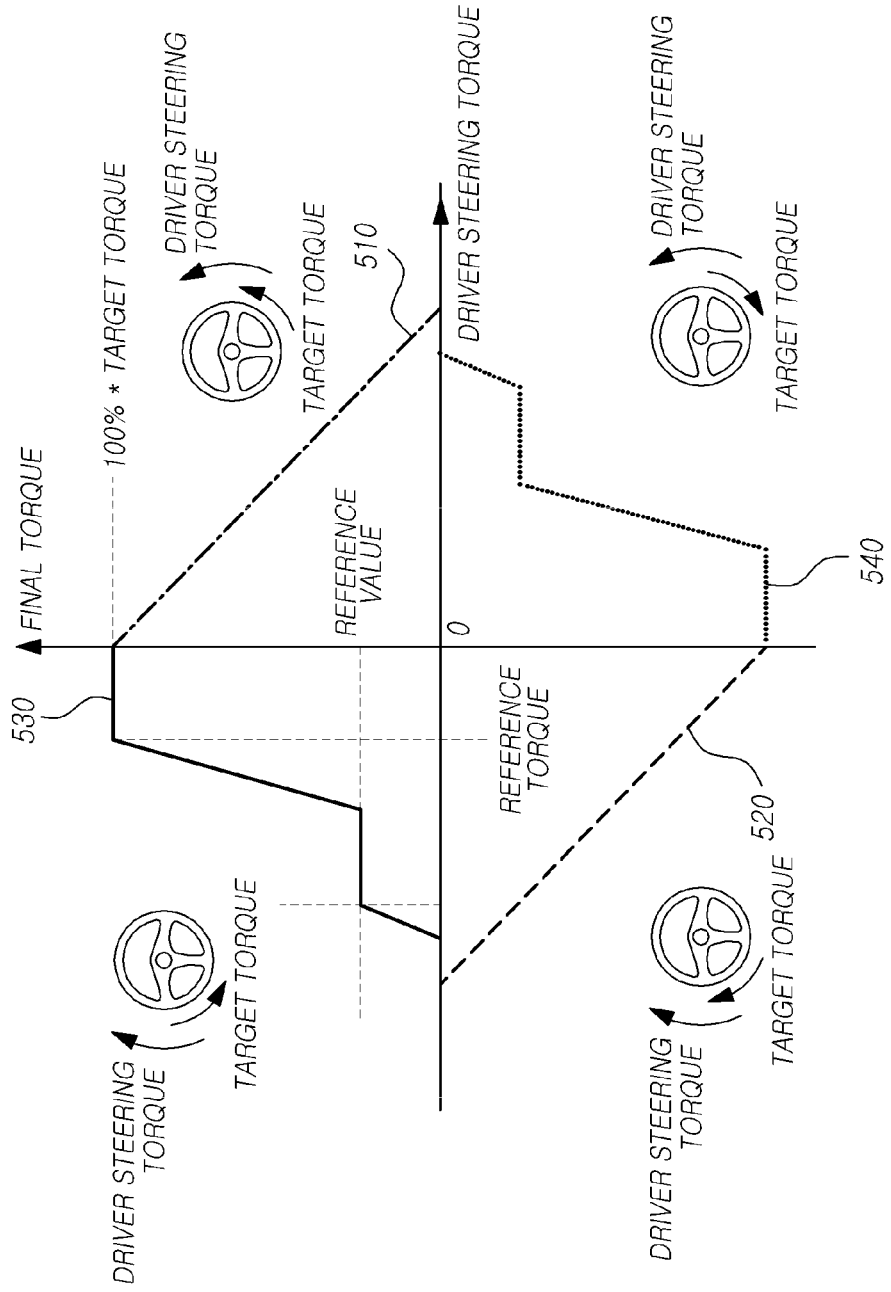
FIG. 5 illustrates an example of a final torque map, according to an embodiment.

FIG. 5 illustrates an example of a final torque map, according to an embodiment.

Referring to FIG. 5, the driver steering torque may be detected as a positive (+) value or a negative (−) value, and the target torque may also be calculated as a positive (+) value or a negative (−) value. In each case, the final torque, according to the embodiment described above, may be calculated as indicated by the reference numerals 510 to 540. Although the counter-clockwise direction denotes a positive (+) value and the clockwise direction denotes a negative (−) value, this may be applied to the opposite case in a similar manner.

For example, in the case where both the driver steering torque and the target torque have the counter-clockwise direction, the final torque 510 may be calculated by subtracting the driver steering torque from the target torque. That is, as the driver steering torque increases, the final torque 510 decreases in proportion thereto.

As another example, in the case where both the driver steering torque and the target torque have the clockwise direction, the final torque 520 may also be calculated by subtracting the driver steering torque from the target torque. That is, as the absolute value of the driver steering torque increases, the absolute value of the final torque 520 decreases in proportion thereto.

As another example, in the case of the driver steering torque in the clockwise direction and the target torque in the counter-clockwise direction, as the absolute value of the driver steering torque increases, the final torque 530 decreases. However, as described above, if the driver steering torque is equal to, or more than, a reference torque, the final torque 530 decreases, and if the driver steering torque reaches a predetermined reference value, the final torque may be maintained.

As another example, if the driver steering torque has the counter-clockwise direction and the target torque has the clockwise direction, the final torque 540 decreases as the absolute value of the driver steering torque increases. In this case, if the driver steering torque is equal to, or more than, a reference torque, the final torque 540 also decreases, and if the driver steering torque reaches a predetermined reference value, the final torque may be maintained.

As described above, the decreasing slope in each case may vary depending on the proportional constant value.

Meanwhile, the vehicle steering device may control the vehicle based on the driver steering torque and the final torque according to the embodiments described above. That is, the vehicle steering device may control the vehicle by generating an auxiliary steering force based on the driver steering torque and the final torque, respectively. Therefore, when the direction of the driver steering torque is the same as the direction of the final torque, the vehicle may move according to the value obtained by a sum of the driver steering torque and the final torque. On the contrary, when the direction of the driver steering torque is opposite to the direction of the final torque, the vehicle may move according to the torque obtained by a sum of the final torque and the driver steering torque.

When a lane change signal is detected, the aforementioned final torque calculating unit may calculate the final torque to be zero.

For example, even if a directional indicator of the vehicle is turned on, the final torque calculating unit may determine that the driver intends to change the lane to then calculate the final torque to be zero even when the driver steering torque and the target torque are detected in the opposite directions. That is, the steering torque that is applied by the lane keeping control device may be calculated to be zero, and the steering device is applied with only the driver steering torque so that the vehicle may be moved according to the driver's intention.

As another example, the final torque calculating unit may calculate the final torque to be zero according to the lane change signal and the presence of nearby vehicles. More specifically, if another vehicle is detected in the lane for the change while the lane change signal is input, the final torque calculating unit calculates the final torque according to the final torque calculating method described above. If no vehicle is detected in the lane to be changed while the lane change signal is input, the final torque may be calculated to be zero. According to this, although the driver intends to change the lane, the lane change is allowed only when the driver's safety is secured instead of performing the lane keeping function. The detection or non-detection of other vehicles may be determined by signals that are input through the radar sensor, the camera sensor, or the laser radar sensor described above.

As described above, the present embodiment provides an effect of reducing the driver's steering heterogeneity when the driver steering torque is input while the lane keeping assist system is in progress. In addition, the present embodiment provides an effect of stably controlling the movement of the vehicle in order to thereby reduce the possibility of accidents when the steering torque calculated by the lane keeping assist system and the driver steering torque overlap each other.

Figure 6:
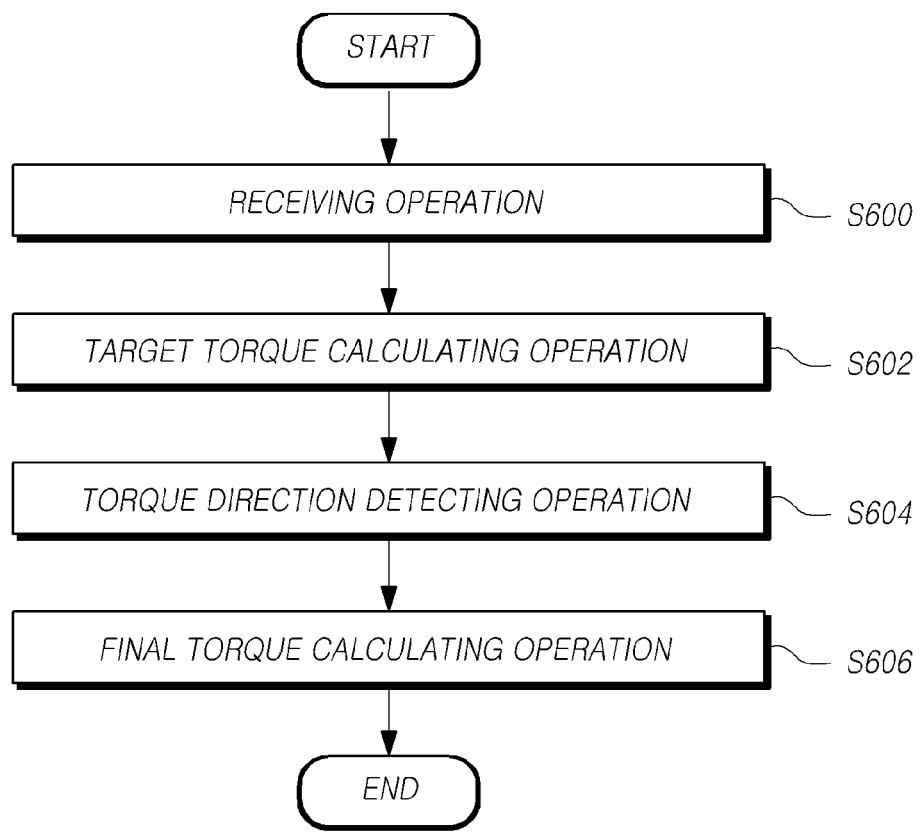
FIG. 6 is a view to explain a lane keeping control method, according to an embodiment.

FIG. 6 is a view to explain a lane keeping control method, according to an embodiment.

A lane keeping control method, according to an embodiment, may include: receiving sensed information containing lane information from one or more sensors in the vehicle; calculating a target torque for the lane keeping of the vehicle based on the sensed information; and calculating a final torque for the lane keeping based on a driver steering torque and the target torque according to the input of the driver steering torque.

Referring to FIG. 6, the lane keeping control method includes an operation of receiving sensed information containing lane information from one or more sensors in the vehicle (S600). For example, the sensed information is received from at least one of the radar sensor, the laser radar sensor, the torque sensor, the vehicle speed sensor, the steering angle sensor, or the camera sensor, which is configured in the vehicle. For example, the sensed information may contain image information and lane image information, which are sensed by the camera sensor. In addition, the sensed information may contain steering torque information or steering angle information of the driver, which is sensed by the torque sensor or by the steering angle sensor. Alternatively, the sensed information may further contain information necessary for determining the lane departure or lane keeping of the vehicle through the lane keeping assist system and information necessary for calculating the target torque for the lane keeping. In the receiving operation, lane information, vehicle travelling direction information, vehicle speed information, and vehicle steering angle information may be further received in order for the lane keeping control device to keep the vehicle in the lane.

Meanwhile, the sensed information may refer to the information itself, which is obtained from the sensors, or may refer to the information obtained by processing the information from the sensors.

The lane keeping control method may include an operation of calculating a target torque for the lane keeping of the vehicle based on the sensed information (S602). For example, in the target torque calculation operation, it may be determined whether or not the vehicle moves out of its lane by using the sensed information in order to thereby calculate a target torque necessary for the lane keeping of the vehicle. Alternatively, in the target torque calculation operation, if the vehicle is determined to leave a predetermined travelling path in the lane, a target torque necessary for the vehicle to follow the corresponding travelling path may be calculated. For example, in the target torque calculation operation, if the vehicle is determined to begin to move out of its lane by using the vehicle speed information received from the vehicle speed sensor, the lane information, and the vehicle travelling direction information, a target torque is calculated in order for the corresponding vehicle to travel along the predetermined path in the lane. If the vehicle travels close to the right lane of the vehicle and if the distance between the vehicle and the road-surface marked line decreases below a predetermined distance, a target torque of the left direction may be calculated such that the distance between the vehicle and the road-surface marked line is changed within a predetermined distance range in consideration of the current vehicle speed information in the target torque calculation operation. At this time, the target torque of the vehicle may be calculated in the target torque calculation operation in consideration of the vehicle speed information in order to thereby prevent an abrupt direction change. Likewise, in the case where the vehicle travels close to the left lane of the vehicle, the target torque may also be calculated through the same procedure in the target torque calculation operation. The calculated target torque may be applied to the control of the vehicle steering angle through the steering control device.

In addition, the lane keeping control method may further include a torque direction detecting operation to detect whether or not the driver steering torque direction and the target torque direction match each other (S604). In the torque direction detecting operation, it may be determined whether or not the direction of the driver steering torque received from the sensor matches the direction of the calculate target torque. In the torque direction detecting operation, the direction of the driver steering torque and the direction of the target torque may be detected, respectively, by using the torque information, and it may be determined whether or not the direction of the driver steering torque matches the direction of the target torque based on the same.

The lane keeping control method includes an operation of calculating a final torque for the lane keeping of the vehicle based on the driver steering torque and the target torque according to the input of the driver steering torque (S606). For example, in the final torque calculating operation, the final torque may be calculated, which is used to change the travelling direction of the vehicle through the steering control device of the vehicle. That is, in the final torque calculating operation, when the vehicle begins to move out of its lane, a steering torque is calculated in order for the vehicle to travel along a predetermined travelling path in the lane. In this case, the final torque may be differently calculated according to the detection or non-detection of the driver steering torque in the final torque calculating operation.

For example, in the final torque calculating operation, if the driver steering torque is input at the time of calculating the final torque for the lane keeping assistance, the final torque may be calculated in consideration of the driver steering torque. For example, in the final torque calculating operation, the final torque for minimizing the driver's steering heterogeneity and for stably maintaining the movement of the vehicle may be calculated in consideration of the driver steering torque in addition to the target torque calculated in the target torque calculating operation.

As another example, if the driver steering torque is not input at the time of calculating the final torque for the lane keeping assistance, the target torque that is calculated in the target torque calculating operation may be calculated as the final torque.

As another example, in the final torque calculating operation, the final torque may be calculated in consideration of the driver steering torque only when the driver steering torque is equal to, or more than, a predetermined reference torque.

Meanwhile, the final torque may be calculated as a value that decreases in proportion to the driver steering torque. That is, when the driver steering torque and the target torque overlap in the same direction, the final torque may be calculated as a value that decreases in proportion to the driver steering torque. For example, the final torque may be calculated by subtracting a value, which is obtained by multiplying the driver steering torque by a proportional constant, from the target torque. As another example, when the driver steering torque and the target torque overlap in the opposite directions, the final torque may be calculated as a value that decreases in proportion to the driver steering torque. For example, the final torque may be calculated by adding a value, which is obtained by multiplying the driver steering torque by a proportional constant, to the target torque. Since the driver steering torque and the final torque have values of the opposite directions, the final torque will decrease based on the target torque in the case of addition.

As another example, the final torque may be calculated to be reduced from the target torque by the method according to the embodiments described above. In this case, a reference torque or a predetermined reference value may be used.

Even when all the elements constituting the above embodiments have been described as being combined into a single unit or combined to be operated as a single unit, the present invention is not necessarily limited to such embodiments. That is, at least two elements of all structural elements may be selectively joined and operate without departing from the scope of the present invention. The above embodiments have been described merely for the purpose of illustrating the technical idea of the present invention, and those skilled in the art will appreciate that various modifications and changes are possible without departing from the scope and spirit of the present invention. The scope of the present invention shall be construed on the basis of the accompanying claims in such a manner that all of the technical ideas included within the scope equivalent to the claims belong to the present invention.

What is claimed is:
1. A control device comprising:
  a receiving unit configured to receive sensed information containing lane information from one or more sensors in the vehicle;
  a target torque calculating unit configured to calculate a target torque for the lane keeping of the vehicle based on the sensed information; and a final torque calculating unit configured to calculate a final torque for the lane keeping based on a driver steering torque and the target torque when the driver steering torque is input, wherein the control device is configured to control movement of the vehicle by using the calculated final torque, wherein when the driver steering torque direction and the target torque direction are detected in the opposite directions, the final torque calculating unit calculates the final torque by a vector sum of the driver steering torque and the target torque, wherein the final torque calculating unit calculates the target torque as the final torque when the driver steering torque is less than a predetermined reference torque, and calculates the final torque by a vector sum of a torque, which is obtained by subtracting the reference torque from the driver steering torque, and the target torque when the driver steering torque is equal to, or more than, the reference torque, and wherein the reference torque has the same direction as the driver steering torque.

2. The control device according to claim 1, wherein the final torque calculating unit further comprises a torque direction detecting unit that is configured to detect whether or not the driver steering torque direction and the target torque direction match each other.

3. The control device according to claim 1, wherein when the driver steering torque direction and the target torque direction are detected in the same direction, the final torque calculating unit calculates the final torque by subtracting the driver steering torque from the target torque.

4. The control device according to claim 1, wherein the final torque calculating unit calculates the final torque to be zero when a lane change signal is detected.

5. A control device comprising:
a receiving unit configured to receive sensed information containing lane information from one or more sensors in the vehicle;
a target torque calculating unit configured to calculate a target torque for the lane keeping of the vehicle based on the sensed information; and
a final torque calculating unit configured to calculate a final torque for the lane keeping based on a driver steering torque and the target torque when the driver steering torque is input,
wherein the control device is configured to control movement of the vehicle by using the calculated final torque,
wherein when the driver steering torque direction and the target torque direction are detected in the opposite directions, the final torque calculating unit calculates the final torque by a vector sum of the driver steering torque and the target torque,
wherein the final torque calculating unit calculates the target torque as the final torque when the driver steering torque is less than a predetermined reference torque, and calculates the final torque by a vector sum of a torque, which is obtained by subtracting the reference torque from the driver steering torque, and the target torque when the driver steering torque is equal to, or more than, the reference torque, and
wherein the reference torque varies depending on the distance between the vehicle and a road surface-marked line.

6. A control device comprising:
a receiving unit configured to receive sensed information containing lane information from one or more sensors in the vehicle;
a target torque calculating unit configured to calculate a target torque for the lane keeping of the vehicle based on the sensed information; and
a final torque calculating unit configured to calculate a final torque for the lane keeping based on a driver steering torque and the target torque when the driver steering torque is input,
wherein the control device is configured to control movement of the vehicle by using the calculated final torque,
wherein when the driver steering torque direction and the target torque direction are detected in the opposite directions, the final torque calculating unit calculates the final torque by a vector sum of the driver steering torque and the target torque, and
wherein the final torque calculating unit, when the final torque reaches a predetermined reference value, maintains the final torque as the reference value.

7. A control method comprising:
receiving sensed information containing lane information from one or more sensors in the vehicle;
calculating a target torque for the lane keeping of the vehicle based on the sensed information;
calculating a final torque for the lane keeping based on a driver steering torque and the target torque according to the input of the driver steering torque; and
controlling, by a control device of the vehicle, movement of the vehicle by using the calculated final torque,
wherein when the driver steering torque direction and the target torque direction are detected in the opposite directions, calculating the final torque by a vector sum of the driver steering torque and the target torque, and maintaining the final torque as the reference value when the final torque reaches a predetermined reference value.

8. The method according to claim 7, wherein the calculating of the final torque further comprises a torque direction detecting operation to detect whether or not the driver steering torque direction and the target torque direction match each other.

9. The method according to claim 7, wherein the final torque decreases in proportion to the driver steering torque.

* * * * *